April 28, 1964     R. M. PHILLIPS ETAL     3,130,582
FLOW METERING SYSTEM

Filed Oct. 19, 1960     2 Sheets-Sheet 1

INVENTORS:
RICHARD MORRISON PHILLIPS
DAVID JOHN LINDSAY-SCOTT
By: Morgan, Finnegan, Durham & Pine
ATTORNEYS

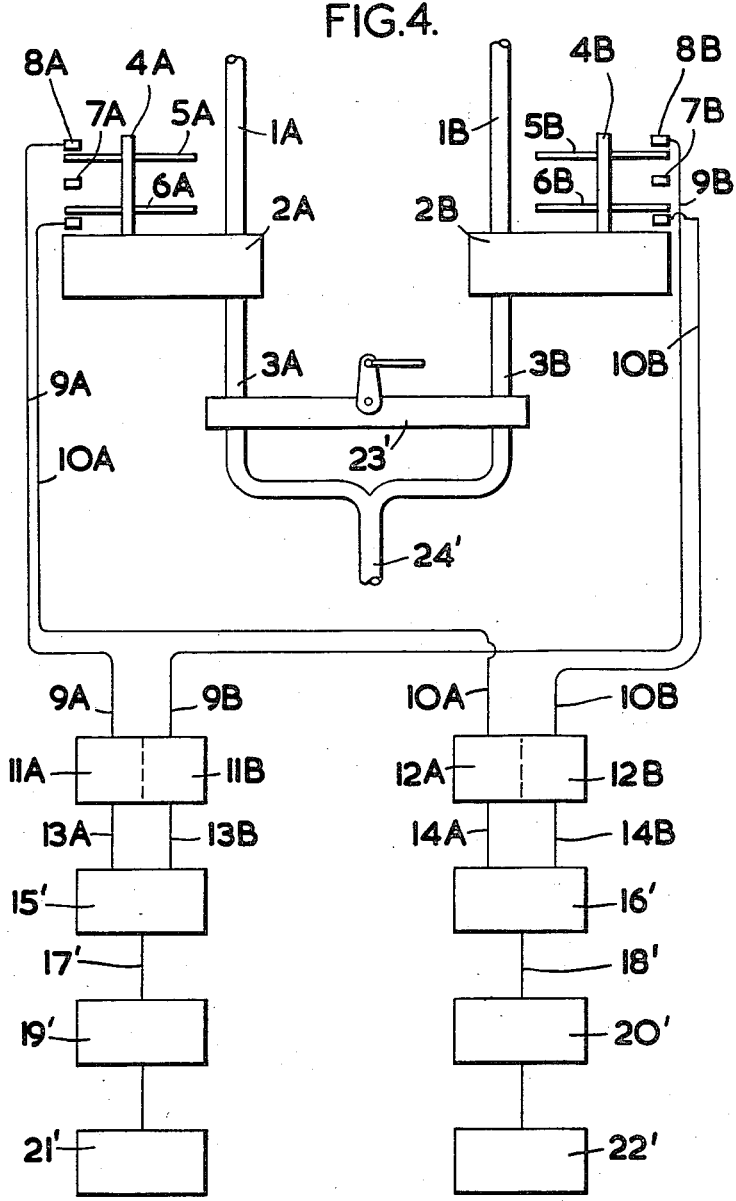

United States Patent Office 3,130,582
Patented Apr. 28, 1964

3,130,582
FLOW METERING SYSTEM
Richard Morrison Phillips and David John Lindsay-Scott, London, England, assignors to The British Petroleum Company Limited, London, and The de Havilland Engine Company Limited, Leavesden, England, both British joint-stock corporations
Filed Oct. 19, 1960, Ser. No. 63,586
Claims priority, application Great Britain Oct. 26, 1959
4 Claims. (Cl. 73—194)

This invention relates to an improved metering system.

It is an object of this invention to provide an improved metering system. It is a further object to provide a metering system particularly suitable for use in a liquid fuel dispensing system. It is a further object to provide an improved liquid fuel dispensing system. Further objects will appear hereinafter.

According to this invention there is provided a metering system comprising a meter, adapted to indicate the value of a property as an angle of rotation of a shaft, and a pulse generator comprising an endless track and a follower, either the track or follower or both being driven by said shaft, the track being adapted to operate in conjunction with a follower and to give rise to a pulse signal when relative movement takes place between the track and the associated follower, the track, hereinafter referred to as a "light regulating track" consisting of alternate sections of differing ability for modifying a beam of light and the follower consisting of a photoelectric device, for example, a photoelectric cell or a transistor, capable, under the action of a beam of light having a varying characterisitc, of providing an electric current of variable strength or of modifying the strength of an electric current.

Preferably, the alternate sections will be opaque and non-opaque; preferably the non-opaque sections will be transparent. If desired, reflecting sections, for example, mirror sections may be alternated with non-reflecting sections.

In use, the track will be illuminated, preferably by a directed beam of light, and the photoelectric device will be sited to receive light alternately of relatively high and low intensity as the different sections of the track in turn modify the light received from the initial source and thereby give rise to a signal comprising a pulse train. Separate light sources may be employed for each track or a single light source may be employed for a number of tracks.

Suitably, the track will be formed of an opaque material having perforations therein or having irregularities, for example, notches, along an edge, which constitute the non-opaque sections. Alternatively, the track may consist of a translucent or transparent material having relatively dark sections superimposed. Thus the track may be formed of photographic material, suitably processed.

Suitably, the track constitutes a ring upon the surface of a disc. If desired two or more discs may be mounted on a common axle. If desired one disc may be fixed to the axle and other discs constitute a set from which a required disc may be selected and temporarily secured upon said axle. Alternatively, a plurality of tracks or all of the tracks may constitute a system of concentric rings upon a single disc. One or more followers may be adapted for movement, at the control of the operator, from one track to another; if desired each track may have its own follower and the required pulse trains selected by use of a mechanical or electrical switching system.

As a modification to the system described, the disc or discs may be replaced by (a) a cylindrical surface, or surfaces, upon which is or are carried the endless tracks or (b) an endless band or bands carrying the endless tracks.

While the apparatus may be designed for use with moving followers and stationary tracks, it will usually be found preferable to maintain the followers stationary and to employ rotating discs, cylinders or bands.

According to one aspect of the invention the meter will be used in association with a fluid stream. Properties which may be measured by the meter are (a) inherent properties of the material constituting the stream for example specific gravity, viscosity, specific thermal or electrical conductivity or colour (b) extrinsic properties of the material, for example temperature and available heat and (c) properties of the stream, for example pressure, flow rate, linear velocity and quantity.

Preferably each meter will measure the passage of unit quantity of fluid as a pre-determined angle of rotation of an output shaft. The meter may be of any type by which this effect is achieved. Preferably the meter is in the form of a power driven positive displacement pump whereby the fluid stream is both brought into motion or assisted in motion and is metered.

The apparatus of this invention is of particular value when incorporated into a liquid fuel dispensing system.

Preferably a meter which measures the passage of unit quantity of fluid as a pre-determined angle of rotation of an output shaft is employed to drive a pulse generator having one track in the form of a ring upon a first disc fixed to an axle and having a second track in the form of a ring upon a second disc detachably secured to this axle. Said first disc is employed to generate a pulse train characteristic of the quantity of fluid passed by the meter; the second disc is employed to generate a pulse train characteristic of the total price of the quantity of fluid which has passed through the meter during a given phase of operation. Since the second disc is detachable it is readily changed to make use of a further disc giving a different pulse train and thus permitting the apparatus to be adjusted to give a pulse train representing any desired price per unit quantity.

Preferably the output shaft of the meter will be connected to a gear train which drives two concentric axles. The inner axle will carry one disc and the outer axle will carry a second disc. Suitably tracks on the two discs will be situated so that both tracks are illuminated by a single lamp positioned between the discs. The gear train may be arranged to drive the two axles at different relative rates in order that a convenient number of track sections may be provided on each disc while meeting differing requirements of pulse frequency in the pulse trains derived from the two discs. Preferably the inner axle will have its disc detachably secured thereto; thus for example, part of the end section of this axle, protruding beyond a tubular outer axle, may be threaded and the disc held in place by a hexagonal or wing nut.

Usually the apparatus will be used for the operation of a receiver fed with a pulse train from the generator. The receiver may be adapted to yield a mechanical output, for example wherein a shaft is rotated through a predetermined angle for each pulse received. This shaft may be used to operate an indicator.

One form of receiver suitable for use with pulse generators according to this invention, requires for its operation, the transmission of pulses in pairs. This may be achieved by a pulse generator which (a) provides an even number of pulse creating zones in each track or (b) provides each track in duplicate, each pair consisting of tracks having the same number of pulse creating zones, the zones in the two tracks being out of phase or (c) makes use of two followers on a single track, the followers being located so that, at any given time, one follower is out of contact with a pulse creating zone.

According to another aspect of this invention there is provided a liquid fuel dispensing system comprising a metering system, as hereinbefore described, a receiver which, in use, is fed with a pulse train from the pulse generator and which yields a mechanical output characteristic of the number of pulses received, and an indicator, for indicating the quantity of fuel which has passed the meter, operated by the mechanical output of the receiver. Preferably this system comprises two sets, each set consisting of a receiver and indicator, one set being adapted to receive a pulse train characteristic of quantity of fuel passing the meter and the other set being adapted to receive a pulse train characteristic of the price of said quantity of fuel.

In our copending British patent application No. 12,181/59 is described a liquid product supply meter and a transmitter adapted to transmit electrical monitoring signals in response to the mechanical output of the meter, said signals providing (a) an indication of the volume or product which, in a given time has passed through the meter and (b) an indication of a value, for example price, which is a function of said volume.

A pulse generator comprising a pulse generator element as hereinbefore described, with reference to any of the embodiments, is very suitable for use as a transmitter for a liquid product system as described in British patent application 12,181/59.

According to a further aspect of the present invention there is provided (a) a liquid product supply system and (b) a multiple liquid product supply system, the system being as described in British patent application 12,181/59 and comprising a pulse generator having a pulse generator element as hereinbefore described.

As described in our copending British patent application No. 24,599/58, the liquid product supply system may also comprise locking means by which supply nozzles for different fuels may be secured in such manner that only the nozzle appropriate to selected transmitter or transmitters can be brought into use.

As described in our copending British patent application No. 34,818/58, the liquid supply system may also comprise a manifold and multi-way valve system by which two or more indicator systems (referred therein as "computors") may be interchangeably operated in association with a plurality of meters.

The invention is illustrated but not limited with reference to the accompanying drawing in which:

FIGURE 4 is a schematic representation of a fuel dispensing system according to the invention.

Figure 1:
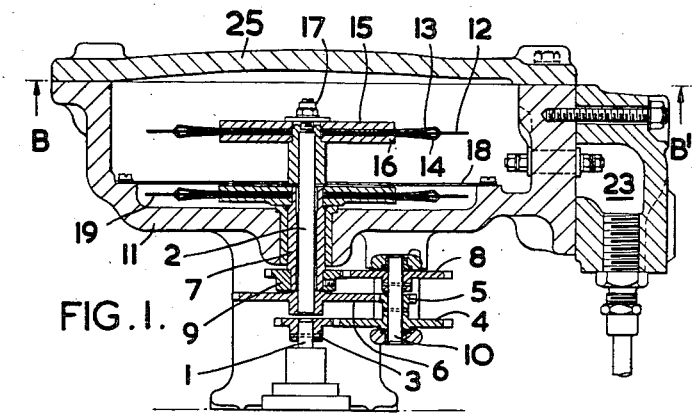
FIGURE 1 is an elevational cross-section, on the line A—A¹ of FIGURE 2, of a metering system according to the invention.
Figure 2:
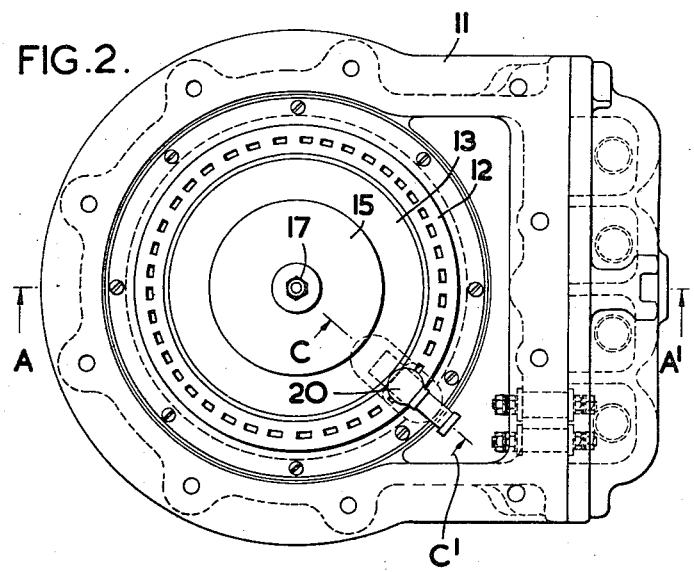
FIGURE 2 is a cross-section in plan on the line B—B¹ of FIGURE 1.
Figure 3:
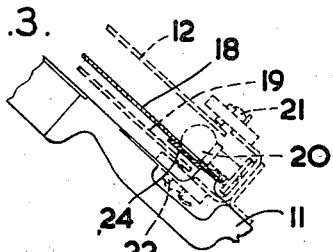
FIGURE 3 is an elevational cross-section, on the line C—C¹ of FIGURE 2.

With reference to FIGURES 1–3:

The output shaft 1 of a fluid supply meter drives pulse generator shaft 2 through gear train 3, 4, 5 and 6 and also drives tubular shaft 7 through gear train 3, 4, 8 and 9. Gears 4, 5 and 8 are carried on a shaft 10. Shafts 2 and 10 are supported in bearings in housing 11.

On shaft 2 is mounted a flat disc 12 having alternate opaque and transparent sections forming an annular track near its circumference. The disc 12 is supported between dished metal discs 13 and 14 which provide stiffening of the outer edge. The discs 13 and 14 are supported between metal plates 15 and 16; this assembly is mounted on a section of shaft 2 of reduced diameter and is detachably secured by nut 17. Below this assembly is an annular disc 18, secured to the housing 2, and having an annular glazed window 24. If desired the attachments of this sheet to the housing may be sealed to prevent unauthorised access to the lower disc 19.

Disc 19 also carries an annular track of opaque and transparent sections and is supported in similar manner on tubular shaft 7. In general it will not be necessary to make changes to this disc after installation and, accordingly, this disc will usually be secured in a permanent manner to shaft 7.

Between disc 12 and annular disc 18 is mounted an electric lamp 20 by which light is thrown through transparent sections of the tracks of discs 12 and 19 on to photoelectric cells 21 and 22 respectively. Leads to the electrical lamp 20 and cells 21 and 22 pass through conduit 23. The housing 11 has a tightly fitting cover 25. Usually the apparatus will be designed to meet standard specifications for flame proofing. Suitably disc 12 has 30–120 transparent sectors and disc 19 has 100 transparent sectors.

In operation, rotation of the meter shaft 1 will give rise to pulse trains derived from the photoelectric cells 21 and 22. From cell 21 is derived a pulse train which is a measure of total price of the fluid passing the meter and from cell 22, a pulse train which is a measure of quantity of fluid passing the meter.

The pulse trains will usually be fed to separate electromechanical devices by which each pulse is converted back to angle of rotation of a shaft and whereby there are operated visual indicators of the quantity of fluid passed by the meter and of the price of this fluid.

With reference to FIGURE 4:

A liquid product supply line 1A is connected to flow meter 2A, off-take being by line 3A. Metering output is by rotating shaft 4A, connected to discs 5A and 6A which each have alternate sectors of transparent and opaque material forming a ring near the periphery. A light source 7A is set to throw a beam through the transparent sectors of discs 5A and 6A, the beam being received by photoelectric cell 8A which, as a result of the interruption of the light beam during rotation of disc 5A, gives rise to a pulse train in lead 9A. Similarly disc 6A gives rise to a pulse train in lead 10A.

Similarly, a second liquid product supply line 1B is connected to meter 2B which is used in a duplicate system to provide pulse trains in leads 9B and 10B. Liquid off-take is by line 3B. Lines 3A and 3B pass to liquid control valve 23' and a blended off-take is obtained by line 24'.

Pulse trains carried by leads 9A, 9B, 10A and 10B are modified by pulse shaping circuits 11A, 11B, 12A and 12B respectively to rectangular wave form, output being by leads 13A, 13B, 14A and 14B respectively.

Pulse trains carried by leads 13A and 13B are added in pulse summating unit 15'; similarly pulse trains carried by leads 14A and 14B are added in unit 16'.

The output pulse trains of units 15' and 16' are carried by leads 17' and 18' and are related to the flow of liquid product through meters 2A and 2B as follows:

Discs 6A and 6B are provided with a number of alternate sectors of transparent and opaque material such that the output signal carried by lead 18' has a convenient pulse frequency for subsequent use in a pulse counter. Disc 6A provides a pulse train in lead 10A which is a measure of the total volume of the liquid passing through meter 2A. Disc 6B provides a pulse train in lead 10B which is a measure of the total volume of the liquid passing through the meter 2B. The summated pulse train in lead 18' is a measure of the total volume of the two liquids which have passed through the meters 2A and 2B. Disc 5A has a number of sectors which provides a pulse train in lead 13A which is a measure of the total price of the liquid passing through meter 2A; disc 5B has, in general, a different number of sectors proportional to the different price of the liquid passing through meter 2B and thus gives rise to a pulse train in lead 13B which is a measure of the total price of the liquid passing through meter 2B. The summated pulse train in lead 17' is a measure of the total price of the two liquids which have passed through the meters 2A and 2B.

The pulse trains in leads 17' and 18' are passed to pulse counters 19' and 20' respectively which are connected, usually electrically or mechanically, to read-out indicators 21' and 22' respectively.

We claim:

1. A metering system comprising, in combination, a meter having an output shaft, adapted to indicate the value of a property of a medium being metered, as an angle of rotation of the shaft; and a pulse generator actuated by said shaft for generating an electric pulse signal comprising at least two trains of electric current pulses which are a measure of the angle of rotation of said shaft, said generator comprising a light beam source, at least two endless tracks for regulating a light beam from said source to produce a light beam having a varying characteristic, each track comprising a light regulating disk mounted on an axle and having alternate sections of differing ability for regulating a light beam, said axles being concentric and being driven by the meter shaft through gearing, a follower comprising at least two photoelectric devices, one for each light beam, for receiving, and acting upon, each light beam having a varying characteristic to provide said electric pulse signal, each track and the follower being mounted for relative angular movement, gear means operatively coupled to said meter shaft, and driven thereby, for angularly moving each track and follower relative to each other in response to rotation of said shaft, at a rate which is directly proportional to the rate of rotation of said meter shaft, to give rise to said electric pulse signal when relative movement takes place between each track and the associated follower, and the light beam source, each track and the follower being surrounded by an atmosphere free from liquid.

2. A metering system as specified in claim 1, whereby two pulse trains are formed, said pulse generator comprising two endless tracks, and said tracks comprising two light regulating discs, each disc being mounted on an axle, the two axles being concentric and being driven independent of each other by the meter shaft through said gear means.

3. A metering system as specified in claim 2, for use in a liquid fuel dispensing system, wherein one of said discs is fixedly attached to one axle, for forming a pulse train characteristic of the quantity of the fuel which has passed the meter, and the other disc is detachably secured to the other axle, for forming a pulse train characteristic of the price of the fuel which has passed the meter.

4. A liquid fuel dispensing system wherein two fuels are mixed comprising two metering systems as specified in claim 1, one for each fuel, the dispensing system also comprising two receivers and two indicators, the respective receivers, in use, being fed with a pulse train from respective pulse generators of each metering system, said receivers including means to add the pulses received from the two pulse generators, each receiver yielding a mechanical output characteristic of the number of pulses received, the respective indicators, in use, being operated by the mechanical output of the respective receivers, one being adapted to receive a pulse train characteristic of quantity of fuel passing the meter, the second receiver being adapted to receive a pulse train characteristic of the price of said quantity of fuel.

References Cited in the file of this patent

UNITED STATES PATENTS

| | | |
|---|---|---|
| 2,125,322 | Svenson | Aug. 2, 1938 |
| 2,204,463 | Allen | June 11, 1940 |
| 2,209,700 | Mayo et al. | July 30, 1940 |
| 2,325,927 | Wilbur | Aug. 3, 1943 |
| 2,346,864 | Packard | Apr. 18, 1944 |
| 2,623,389 | Van Oosterom | Dec. 30, 1952 |
| 2,859,616 | Fellows | Nov. 11, 1958 |
| 2,962,895 | Rumble | Dec. 6, 1960 |